(12) United States Patent
Zörnack

(10) Patent No.: US 6,731,680 B1
(45) Date of Patent: May 4, 2004

(54) METHOD OF CHANGING FROM A FIRST TRANSMISSION PATH AND/OR TRANSMISSION MODE TO A SECOND TRANSMISSION PATH AND/OR TRANSMISSION MODE

(75) Inventor: Alexander Zörnack, Unterschleissheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/306,172

(22) Filed: May 6, 1999

(30) Foreign Application Priority Data

May 6, 1998 (DE) .......................................... 198 20 221

(51) Int. Cl.[7] .............................................. H04B 17/00
(52) U.S. Cl. ........................ 375/224; 375/295; 370/465
(58) Field of Search ................................ 375/224, 257, 375/259, 260, 285, 286, 295; 370/216, 225, 226, 227, 228, 237, 260, 252, 465, 467; 455/226.2, 410

(56) References Cited

U.S. PATENT DOCUMENTS

| | | | | |
|---|---|---|---|---|
| 4,996,685 A | | 2/1991 | Farese et al. ................ | 370/352 |
| 5,471,671 A | * | 11/1995 | Wang et al. ............. | 455/226.2 |
| 5,677,931 A | * | 10/1997 | Okuyama et al. ........... | 375/260 |
| 5,682,460 A | | 10/1997 | Hyziak et al. ............... | 709/217 |
| 5,878,029 A | * | 3/1999 | Hasegawa et al. .......... | 370/236 |
| 6,061,363 A | * | 5/2000 | Evans et al. ................ | 370/467 |
| 6,256,491 B1 | * | 7/2001 | Ehlers et al. ............... | 455/410 |

* cited by examiner

Primary Examiner—Chieh M. Fan
(74) Attorney, Agent, or Firm—Laurence A. Greenberg; Werner H. Stemer; Ralph E. Locher

(57) ABSTRACT

The method allows the transmission protocol and/or the transmission path to be changed during the transmission and without an interruption. This is done by a central decision system, as a function of requirements which are either entered or changed by the subscriber during the transmission, or as a function of limit values which are defined before or during the transmission.

12 Claims, 4 Drawing Sheets

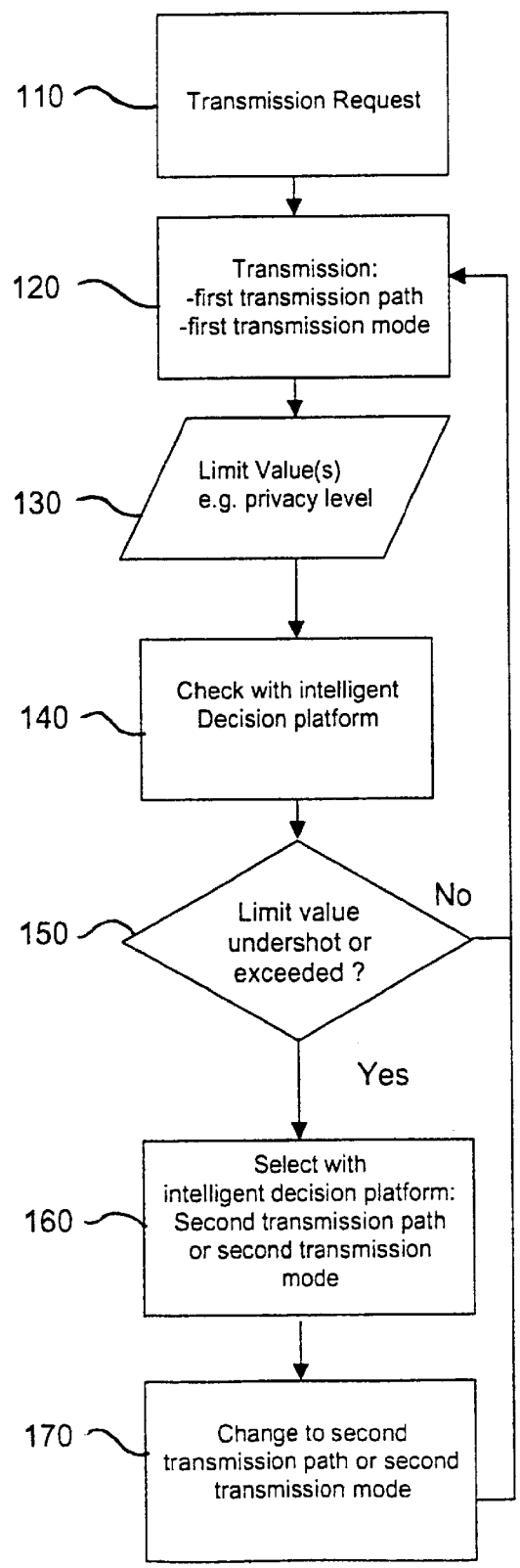

METHOD OF CHANGING FROM A FIRST TRANSMISSION PATH AND/OR TRANSMISSION MODE TO A SECOND TRANSMISSION PATH AND/OR TRANSMISSION MODE

BACKGROUND OF THE INVENTION

Field of the Invention

The invention lies in the telecommunications field. More specifically, the invention pertains to a method for transmitting information such as data, voice, etc.

In order to transmit information, a telecommunications subscriber must explicitly select a transmission path, and thus a transmission protocol, before the transmission of information may start.

A user of a conventional telephone system may make a selection between various telephone network providers. For example, an additional dialing code, which is dialed before the actual telephone number (so-called "preselection"), is used to select a network provider for the entire call. The choice of the provider is thereby made by the subscriber on the basis of information such as tariff details available to him or her.

PC-users, as well, have a number of options for making a transmission to a destination apparatus. This extends from direct transmission by means of a modem and telephone line to use of so-called on-line service providers (such as AOL®, CompuServe®) or an Internet Provider.

If the transmission quality deteriorates severely during the call, the call is, however, interrupted.

If the subscriber requirements change during the transmission, then the user's only option is to terminate the call, and to set up a new call that meets the changed requirements.

SUMMARY OF THE INVENTION

It is accordingly an object of the invention to provide a method of changing from a first transmission path and/or transmission mode to a second transmission path and/or transmission mode, which overcomes the above-mentioned disadvantages of the heretofore-known devices and methods of this general type.

With the foregoing and other objects in view there is provided, in accordance with the invention, a transmission method with which it is possible to change from a first transmission path and/or transmission mode to a second transmission path and/or transmission mode without interrupting the transmission. The method comprises the following steps:

selecting, with a decision system, a first transmission path and/or a first transmission mode in dependence on at least one limit value;

during the transmission, checking the selection of the transmission path and/or the transmission mode at least once;

if the limit value is found to be undershot or exceeded during the transmission, selecting a second transmission path and/or transmission mode with the decision system; and changing over to the second transmission path and/or transmission mode without interrupting the transmission.

In an alternative, user-requested changeover, the transmission method comprises the following steps:

selecting, with a decision system, one of a first transmission path and a first transmission mode in dependence on at least a first limit value;

during the transmission, signaling a change in the first limit value or a second limit value;

checking the transmission path and/or the transmission mode and, if the changed limit value is found to be undershot or exceeded during the transmission, selecting a second transmission path and/or transmission mode with the decision system; and changing over to the second transmission path and/or transmission mode without interrupting the transmission.

In other words, the method allows the transmission protocol and/or the transmission path to be changed during the transmission. This is done as a function of requirements which are either entered or changed by the subscriber during the transmission, or as a function of limit values which are defined before or during the transmission.

The subscriber who wishes to make a transmission first of all sets up a transmission path with the aid of an intelligent decision platform. A first path is defined, and the transmission is started, on the basis of previously stored service requirements for the subscriber.

If either the subscriber requirements or the quality of the transmission now change or changes during the transmission, then the decision platform is informed of the necessity to define a second transmission path.

This procedure results in the optimum transmission protocol for the application, and the appropriate transmission path, being selected at the start of the transmission. Furthermore, the automatic use of an optimum protocol is maintained during the transmission as well, if a change in the transmission protocol is initiated by an intelligent decision platform as a result of specific limit values being exceeded or undershot.

In accordance with an added feature of the invention, the checking step comprises comparing a transmission quality during the transmission with a limit value. It is also possible, to compare an available bandwidth with a limit value. Furthermore, it is possible to compare an available privacy level with a limit value during the transmission.

The requirements and limit values on the basis of which the intelligent decision platform makes path selection decisions and defines transmission paths relate to so-called service quality parameters for the transmission, such as the available bandwidth, the transmission security, the transmission rate or the costs. Other factors may play a role in package-switched data transmission, for example the frequency of repetitions (that is to say how many packets reach the receiver) or else the transmission security, that is to say the privacy level of the transmission path.

If, for example, the intelligent decision platform measures the bandwidth provided by the selected transmission path during the transmission, and in the process optimizes the costs of the transmission, then a change to the transmission protocol and/or path can be initiated if this bandwidth falls below a specific limit value. This is worthwhile if, for example, the nature of the transmission requires a minimum bandwidth, for example a video transmission.

In accordance with an additional feature of the invention, the intelligent decision system has stored information suitable for producing a limit value for the transmission, and the limit value is accordingly defined with the decision system. The stored information is preferably communication-subscriber specific information.

In accordance with a concomitant feature of the invention, the communication subscriber is automatically identified, using identification tags supplied prior to the transmission.

The intelligent decision platform can automatically decide on the optimum transmission path by using information which it has already stored in advance. This information may be entered in the form of a service profile or a service requirement by a subscriber, in advance, or may be stored in a subscriber profile on the basis of transmissions which had been required in the past.

The identity of the subscriber can be determined at the start of transmission. In the telephone network, this is done in the form of the "Calling Party Address" (CgPA). On the Internet, this is done by the Internet address and, for example, the "login" name of the subscriber.

Other features which are considered as characteristic for the invention are set forth in the appended claims.

Although the invention is illustrated and described herein as embodied in method for changing from a first transmission path and/or transmission mode to a second transmission path and/or transmission mode, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

FIGS. 3a and 3b are flow diagrams of a transmission method using an intelligent platform according to the present invention.

DESCRIPTION OF THE PREFERRED EMBODIMENTS

Figure 1:
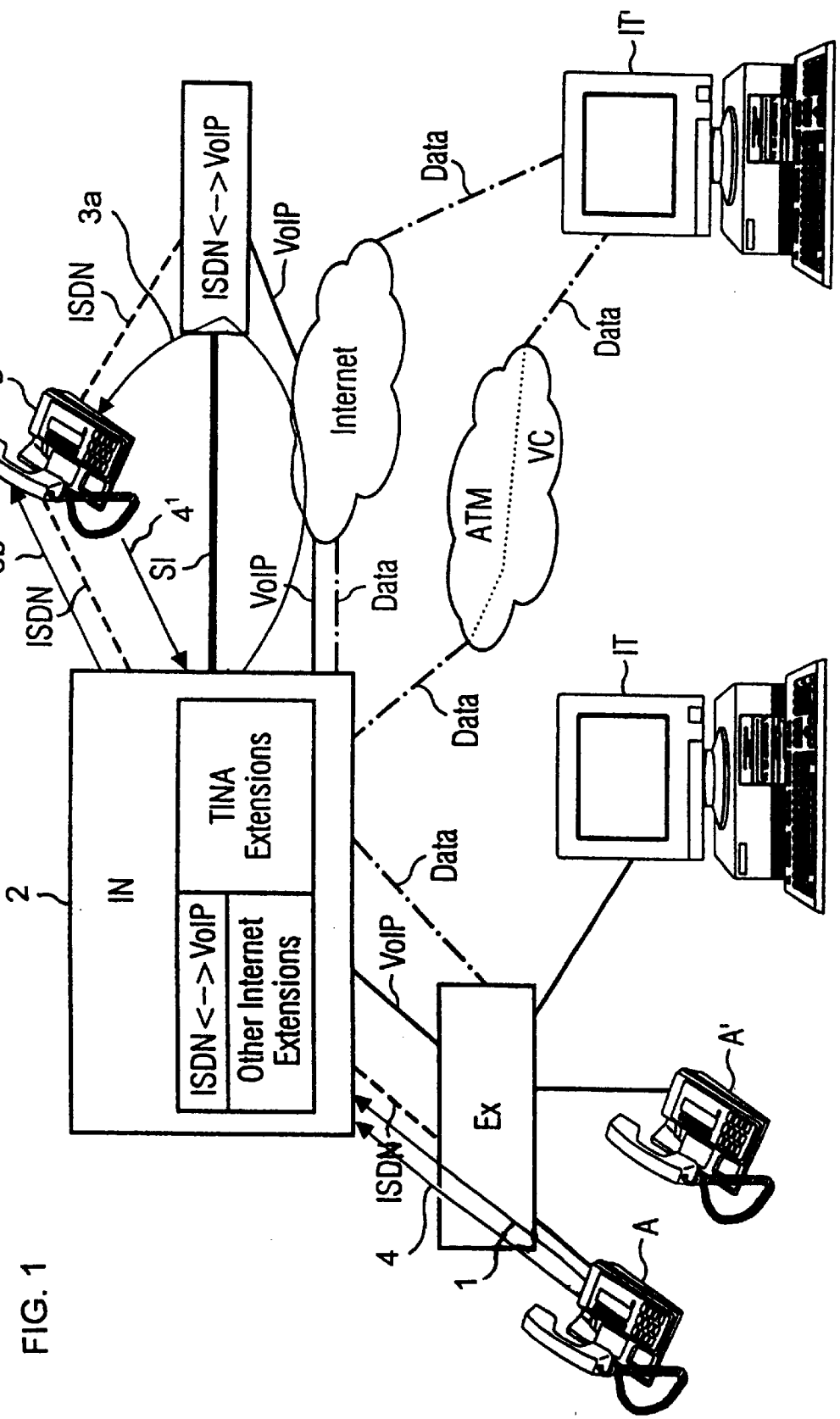
FIG. 1 is a diagrammatic view of an exemplary layout of a communications network which provides various transmission paths and transmission protocols.
Figure 2:
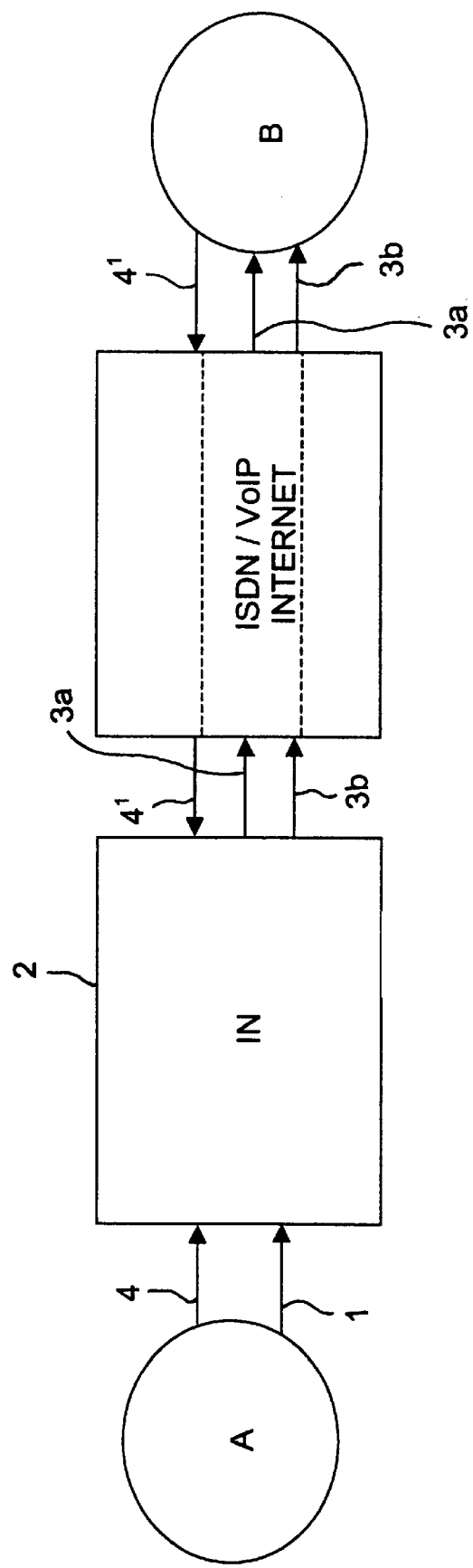
FIG. 2 is a flow diagram of a communication network method for selecting different transmission paths and modes.

Referring now to the figure of the drawing in detail, there is seen a network in which the subscribers use various terminals, for example conventional telephones A, A', ISDN telephones B or other information terminals IT, IT' for data transmission.

An intelligent decision platform IN is on the one hand connected to the communication networks, for example via exchanges Ex and various links ISDN (Integrated Services Digital Network), VoIP (Voice over IP), and data, to various networks ATM (Asynchronous Transfer Mode), Internet. The different types of links are denoted by different types of lines in the figure. The intelligent decision platform IN includes a block TINA (Telecommunications Information Networking Architecture) with the associated extensions.

The intelligent decision platform IN in this case includes functions which are required to process the various requests, for example conversion of ISDN calls to voice transmission via the Internet (Voice over IP), and vice versa.

A number of exemplary embodiments will now be described in the following text with reference to the figure.

Example 1

Telephone Call

A telephone subscriber A wishes to make a telephone call to a second subscriber B. In order to use the advantages of an adaptive change in the transmission protocol as a function of requirements relating to the service quality and cost, A sets up the call via the intelligent decision platform IN (as shown by 1 in the drawings).

On the basis of the already stored service requirements for the subscriber A, IN determines how the call to B should be set up. The decision platform in this case recognizes the identity of A by means of the Calling Party Address, which is transmitted while the call is being set up (as shown by 2 in the drawings).

If this is not a conventional (ISDN) telephone, but a specific telephone for an Internet service for voice transmission (Voice over IP), then the IP address of the terminal as well as the login or similar unique tags are used (IP=Internet Protocol) (as shown by 3a in the drawings).

a) Decision Criterion—Cost

Assuming that the subscriber is mainly interested in very good transmission, the transmission rate or security is of secondary importance in this context. The intelligent decision platform will then decide on transmission of voice data in package form via the Internet, the so-called "Voice over IP." The minimum bandwidth required for the transmission is then defined as a limit value, and the transmission is passed via the Internet only provided this limit value is not undershot.

However, if the intelligent decision platform finds by measurement that the previously defined limit value has been undershot, the transmission is changed to another transmission path/protocol. This can be done by means of a renewed decision process (as on the first occasion) or else by a "standard diversion," a so-called default path. The transmission should not be interrupted in the process.

b) Decision Criterion—Privacy Level

The intelligent decision platform IN may also use more far-reaching information in the subscriber profile. For example, the desired privacy level can be stored in the form of a "security level." This may be done, for example, on the basis of the subscriber's position in a company.

For example, calls by company managers may have a very high security level; the same applies to calls by employees in certain company areas, such as finance, personnel, etc.

In this case, the security level can be upgraded by changing the transmission path. A data stream in a package-switched network can in theory be monitored.

In order to prevent this, certain transmission paths may be excluded if transmission is desired with an increased privacy level. Such transmissions are then, for example, passed as far as possible over the company's own tie lines. Encryption mechanisms may also be used to improve the privacy level.

One advantageous development of the invention provides the option for the subscriber to use an input (shown in FIG. 1 by 4, 4') (for example pushing a button or a specific key combination) during the call to signal that he or she desires a different security level. This wish can be transmitted via DTMF (dual-tone multifrequency) or else, for example, using SS7 coding (SS7=central channel signaling system No. 7). This is shown by 4 in the drawings.

After receiving that signaling, the intelligent decision platform IP then decides whether it is necessary to change the transmission path, or to change the transmission protocol. It then carries out the desired changes, that is to say the additional use of an encryption algorithm or the change to another transmission path. The transmission continues, and the change is carried out without being noticed by the subscriber.

A brief confirmation (for example acoustically) may, however, also indicate to the subscriber that he or she now has available a transmission with a higher security level.

If a subscriber A wishes to make a call to a subscriber B who has ISDN access, then there are various options with the configuration illustrated by way of example in the drawings.

A has ISDN access:

The transmission can optionally be passed completely via the ISDN line from the intelligent decision platform (as shown by 3b), or at least a part of the transmission is made via another link, for example Voice over IP, in order to save costs (as shown by 3b).

However, additional ISDN<-> VoIP functions are required for this purpose, which ensure, for example, data conversion, in order that the transmission can be transmitted using a number of protocols of different types. Since this conversion must also be carried out at the B subscriber end, such a function is available there. This can be controlled via control information SI from the intelligent decision platform IN.

A does not use ISDN access (but, for example, Voice over IP):

This is similar to the above situation.

The transmission via Voice over IP is either passed to the decision platform where it is converted into ISDN signals or it is passed on via the appropriate IP transmission paths, in order to be converted shortly before reaching the subscriber B.

Example 2

Data Link

In a similar way to that for a telephone call, there are also widely differing requirements for service quality and costs for data links.

These may on the one hand be requirements for quality of service: a certain minimum transmission bandwidth is required for certain data, for example video, in order to achieve acceptable transmission quality. Furthermore, the number of errors (for example lost data packets or data packets rejected for certain reasons during transmission) must not exceed a certain limit value. Furthermore, a decision relating to the desired (or permissible) transmission quality and security can be made as a function of the subscriber (who can be identified via the IP address and tag).

Assuming that the subscribers IT and IT' belong to a virtual company network, which is interconnected via external networks. A conventional link can thus be set up via Ex, and the data link Data via Internet from IN. In order to achieve improved transmission security for company-internal data, an additional security protocol may be used.

If the transmission rate is too low to meet the requirements of the subscriber IT or IT', then the intelligent decision platform IN passes the call via, for example, a dedicated ATM link, represented in the figure by a second link, Data and ATM (VC=virtual circuit) to IT'.

If the requirement for transmission security increases, the intelligent decision platform can likewise select another transmission path and/or another transmission protocol.

Figure 3B:
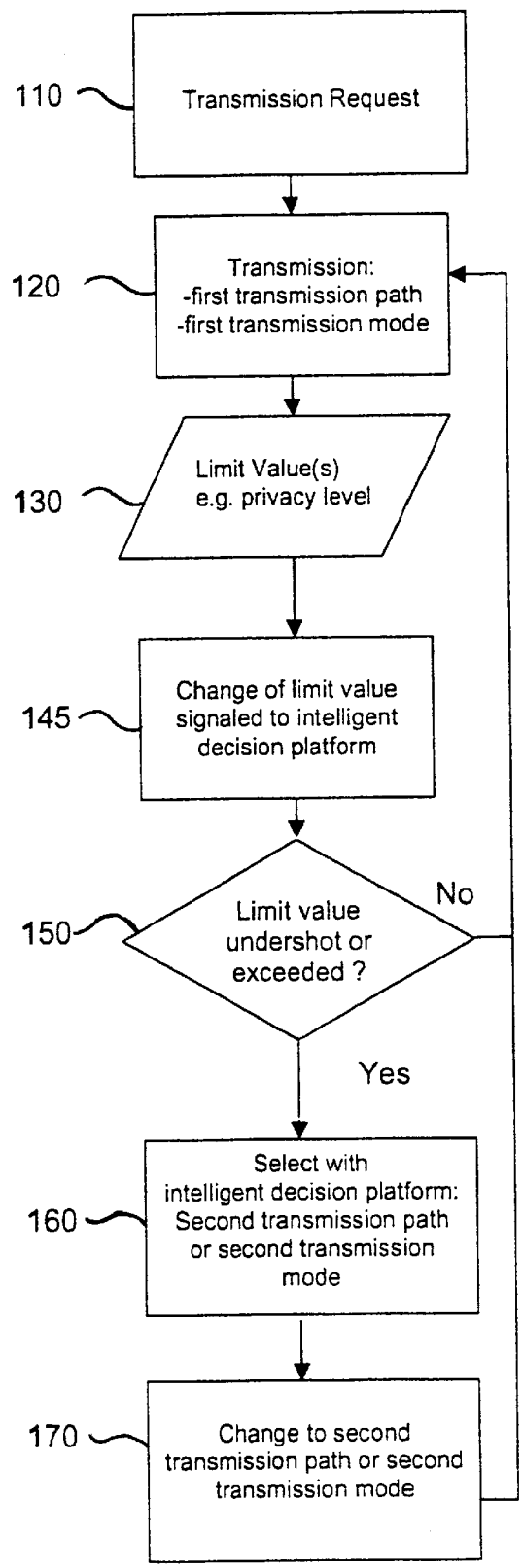

FIGS. 3a and 3b show a transmission method, according to the present invention, wherein a transmission request 110 is received. By using the intelligent decision platform, the appropriate transmission path as shown at 120 is selected, either a first transmission path or a first transmission mode depending on at least one limit value as shown at 130. During the transmission, the intelligent decision platform is checked as shown at 140 at least once regarding the selection of the first transmission path or the first transmission mode. If, during the checking step, the limit value is found to be undershot or exceeded (as shown at 150) during the transmission, then a second transmission path or a second transmission mode is selected as shown at 160 using the intelligent decision platform. The changeover to the selected second transmission path or the second transmission mode is achieved without interrupting the transmission as shown at 170.

FIG. 3b is similar to FIG. 3a, the difference being that during the transmission, a change in the first limit value or the second limit value is signaled as shown at 145 to the intelligent decision platform.

I claim:

1. A transmission method, which comprises:

selecting, with an intelligent decision platform, at least one of a first transmission path and a first transmission mode in dependence on at least one limit value;

during the transmission, checking with the intelligent decision platform the selected at least one of the first transmission path and the first transmission mode at least once including comparing an available privacy level during the transmission with a limit value;

if, in the checking step, the limit value is found to be undershot or exceeded during the transmission, selecting with the intelligent decision platform at least one of a second transmission path and the second transmission mode; and changing over to the selected at least one of the second transmission path and the second transmission mode without interrupting the transmission.

2. The method according to claim 1, wherein the checking step comprises comparing a parameter for transmission quality during the transmission with the at least one limit value.

3. The method according to claim 1, wherein the checking step comprises comparing an available bandwidth during the transmission with the at least one limit value.

4. The method according to claim 1, wherein the intelligent decision platform has stored information suitable for producing the at least one limit value for the transmission, and the selecting step comprises defining the at least one limit value with the intelligent decision platform.

5. The method according to claim 4, wherein the stored information is communication-subscriber specific information.

6. The method according to claim 1, which comprises automatically identifying a communication subscriber, using identification tags supplied before the transmission.

7. A transmission method, which comprises:

selecting, with an intelligent decision platform, at least one of a first transmission path and a first transmission mode in dependence on at least a first limit value;

during the transmission, signaling a change in a selected one of the first limit value and a second limit value to the intelligent decision platform;

checking the selected at least one of the first transmission path and the first transmission mode during the transmission including comparing a parameter for an available privacy level during the transmission with the selected limit value and, if the changed selected limit value is found to be undershot or exceeded during the transmission, selecting at least one of a second transmission path and a second transmission mode with the intelligent decision platform; and changing over to the selected at least one of the second transmission path and the second transmission mode without interrupting the transmission.

8. The method according to claim 7, wherein the checking step comprises comparing a parameter for transmission quality during the transmission with the selected limit value.

9. The method according to claim 7, wherein the checking step comprises comparing an available bandwidth during the transmission with the selected limit value.

10. The method according to claim 7, wherein the intelligent decision platform has stored information suitable for producing the first limit value for the transmission, and the selecting step comprises defining the first limit value with the intelligent decision platform.

11. The method according to claim 10, wherein the stored information is communication-subscriber specific information.

12. The method according to claim 7, which comprises automatically identifying a communication subscriber, using identification tags supplied before the transmission.

* * * * *